United States Patent [19]

Briscoe et al.

[11] Patent Number: 4,561,154
[45] Date of Patent: Dec. 31, 1985

[54] WEDGE-TYPE ROPE SOCKET CONNECTION AND METHOD

[75] Inventors: Terry L. Briscoe; Robert L. Van Hoomissen, both of Portland, Oreg.

[73] Assignee: ESCO Corporation, Portland, Oreg.

[21] Appl. No.: 604,063

[22] Filed: Apr. 26, 1984

[51] Int. Cl.⁴ ............................................. F16G 11/04
[52] U.S. Cl. .............................. 24/136 K; 24/136 R; 24/136 L; 24/115 M; 403/211
[58] Field of Search ............ 24/136 R, 136 K, 136 L, 24/115 R, 115 M, 134 L, 134 WL; 403/16, 211, 213, 409

[56] References Cited

U.S. PATENT DOCUMENTS

| | | | |
|---|---|---|---|
| 1,248,991 | 12/1917 | Barger | 403/213 |
| 1,297,187 | 3/1919 | Lamb | 403/211 |
| 1,315,969 | 9/1919 | Kienzle | 403/211 |
| 1,644,376 | 10/1927 | Haworth | 403/211 |
| 1,647,398 | 11/1927 | Draheim et al. | 24/115 M |
| 3,335,470 | 8/1967 | Baer | 403/211 |
| 3,681,808 | 8/1972 | Hahn et al. | 24/115 R |
| 3,905,711 | 9/1975 | Rogers | 24/115 M |
| 4,066,368 | 1/1978 | Mastalski et al. | 24/115 M |
| 4,313,243 | 2/1982 | Childress et al. | 24/115 M |

Primary Examiner—Victor N. Sakran
Attorney, Agent, or Firm—Tilton, Fallon, Lungmus & Chestnut

[57] ABSTRACT

A socket-wedge connection for wedge-type rope socket wherein a multi-part wedge is employed having one part collapsible, finding advantageous use, for example, in the lines employed with excavating equipment.

6 Claims, 12 Drawing Figures

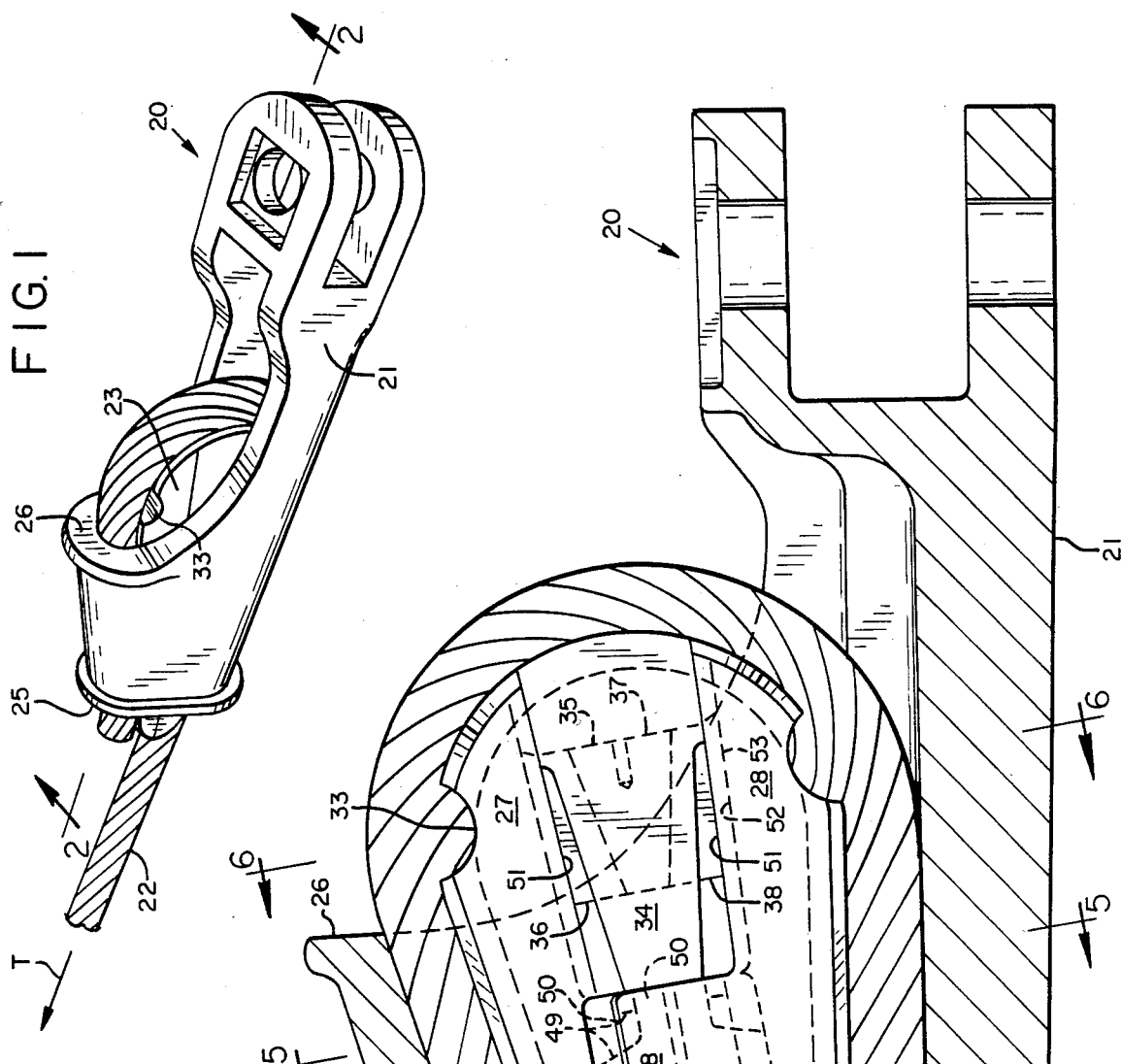
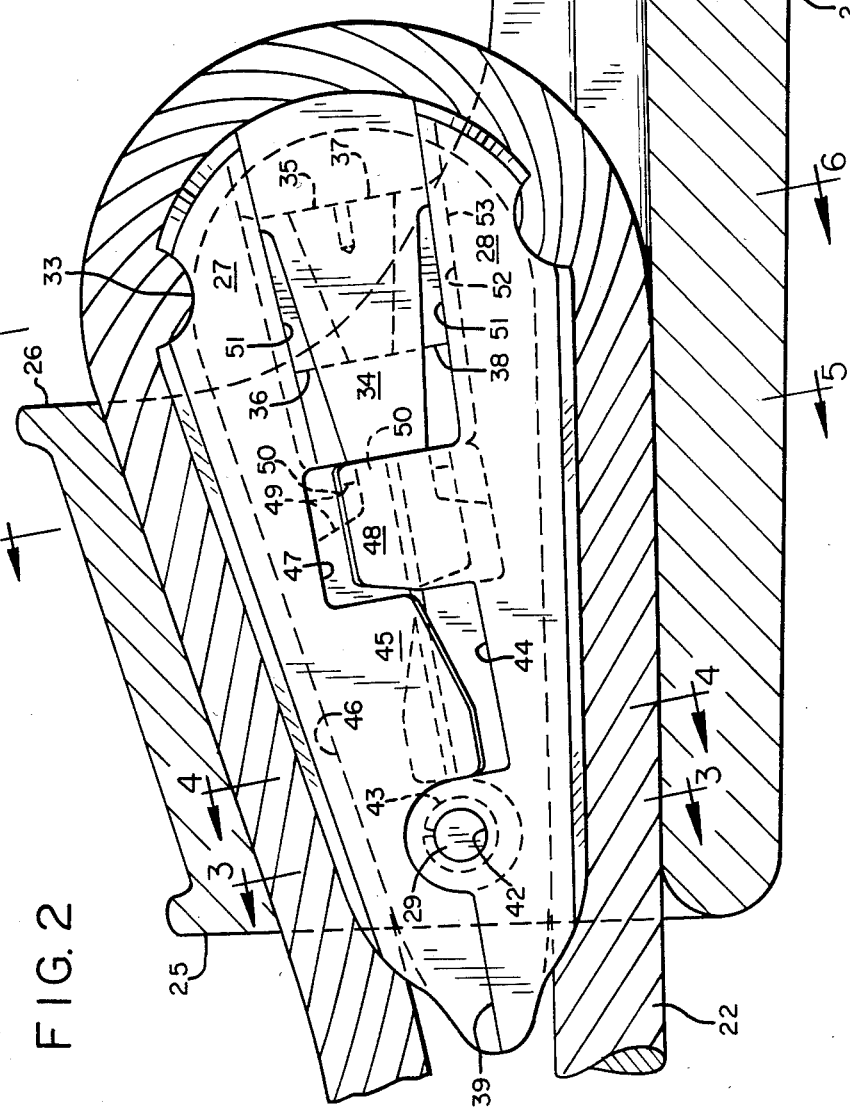

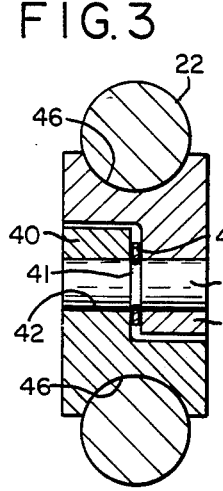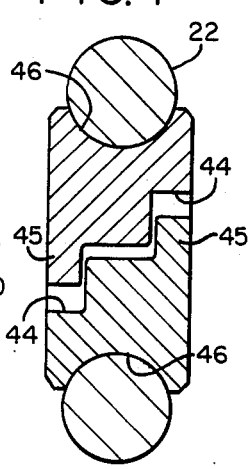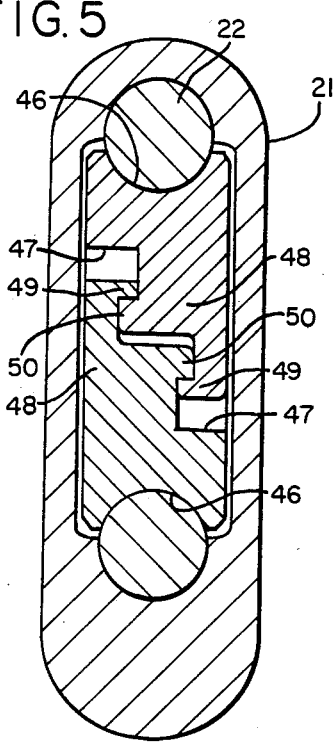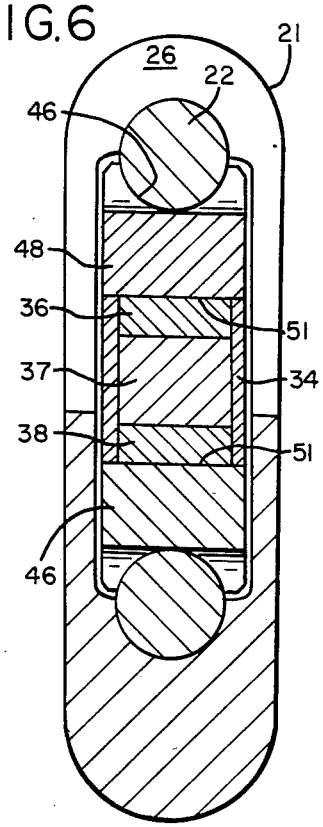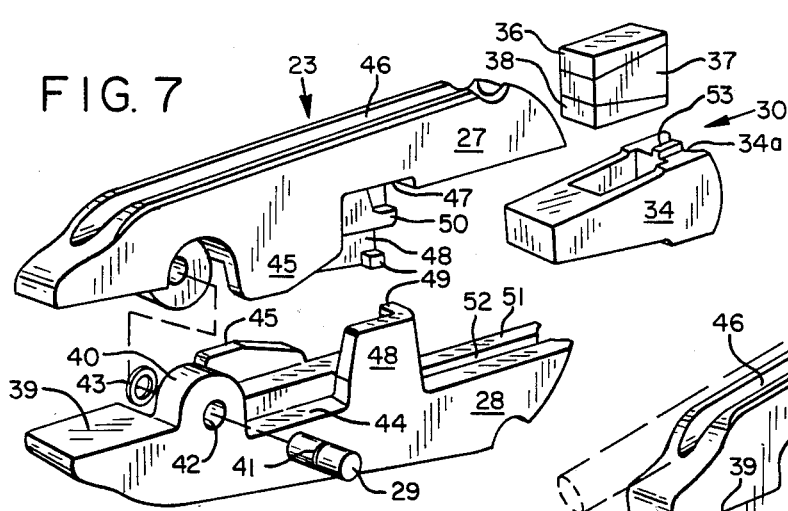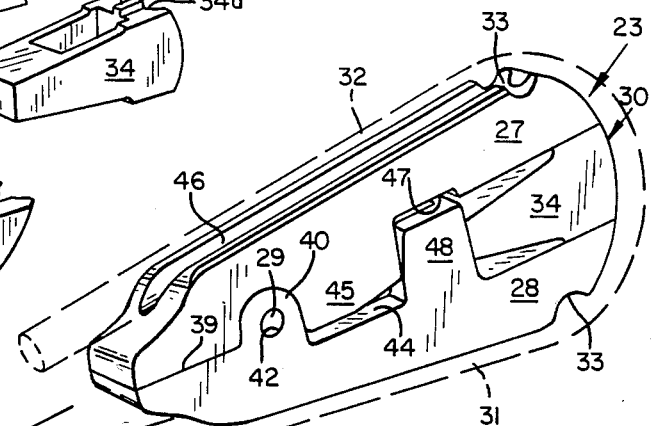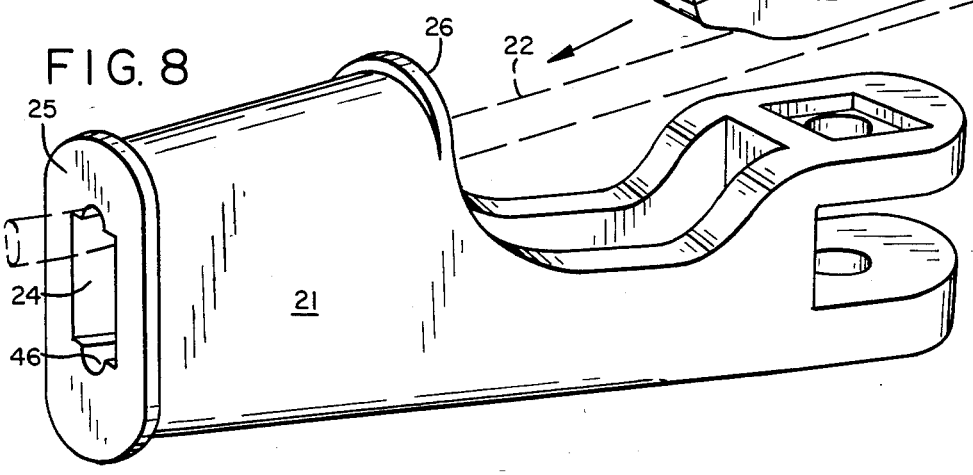

WEDGE-TYPE ROPE SOCKET CONNECTION AND METHOD

BACKGROUND AND SUMMARY OF INVENTION

This invention relates to a wedge-type rope socket connection and method and, more particularly, to a connection which is readily disassembled in the field when used as part of the dragline, hoist line or dump line of a dragline bucket or any of the attaching lines for a cable shovel, cable hoe, etc.

The general environment where the invention finds application is seen in co-owned U.S. Pat. No. 3,681,808. For example, wedge-type rope sockets are employed to secure the wire ropes forward and above the bucket for operating the same. Essentially, the socket is a relatively elongated member having a smaller end and a larger end and a tapered passage extending therethrough. The wire rope is looped on itself and held in place by a wedge.

At present, these wedges, because of their difficulty of removal, are being blown out by various forms of cannons, are being pressed out in shops, etc. Almost every form of present removal requires either a large sledge, a pendulum ram, or cannon, all of which could be very dangerous because of the resultant force required to remove the wedge. In addition to the safety factor, the currently used construction results in expensive down-time in the case of rope change-out. Some of the large machines incur a down-time cost of approximately $5,000 per hour and the change-out of a dump rope can take as long as three to four hours. This also applies to such prior art expedients as seen in U.S. Pat. No. 3,905,711.

The invention avoids these disadvantages through the provision of a multi-part wedge which includes a pair of longitudinally extending wedge forming means along with a collapsible insert means there between. More particularly, the insert means can take the form of wedge shaped parts slidable relative to each other when the constraining force exerted by the rope loop is removed or by a heat destructible element, or both.

Other objects and advantages of the invention may be seen in the details of the ensuing specification.

The invention is described in conjunction with the accompanying drawing, in which FIG. 1 is a fragmentary perspective view of a portion of a dragline featuring the socket with the inventive wedge;

FIG. 2 is an enlarged longitudinal section such as would be seen along the sight line 2—2 of FIG. 1;

FIGS. 3-6 are transverse sectional views taken along the sight lines 3—3, 4—4, 5—5, and 6—6, respectively, of FIG. 2;

FIG. 7 is an exploded perspective view of the socket and wedge of the invention;

FIG. 8 is a perspective disassembled view showing the wedge about to be inserted into the socket with the wire rope shown in dashed line;

DETAILED DESCRIPTION

Figure 9:
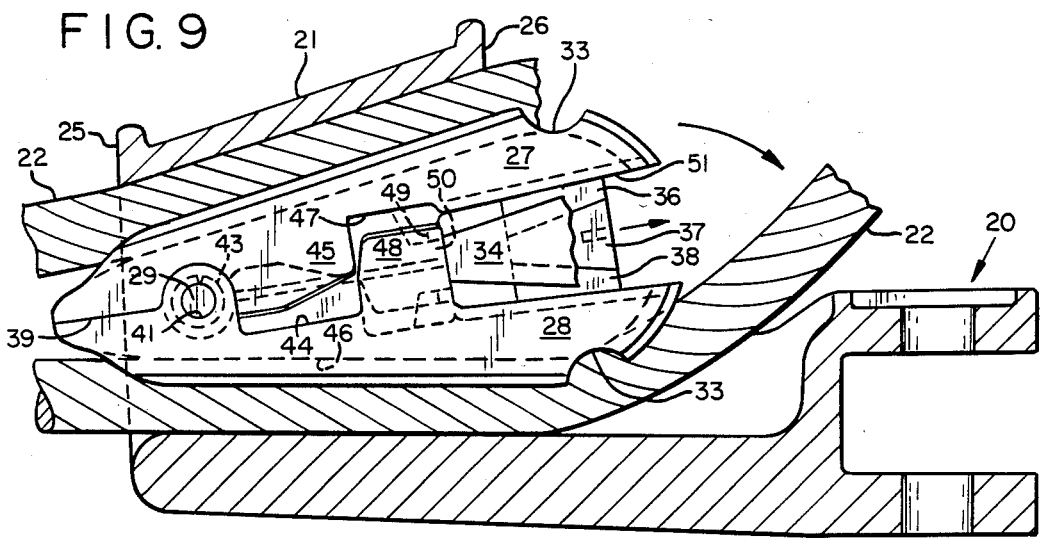
FIG. 9 is a sectional view similar to FIG. 2 but with the wire rope severed so as to illustrate the method of disassembling the connection.

In the illustration given and with reference first to FIG. 1, the numeral 20 designates generally the wedge socket connection which is seen to include a socket 21 adapted to be connected to a shackle, a wire rope 22 looped on itself and a wedge 23 holding the looped rope in place. As mentioned previously, the inventive connection finds utility in applications such as are seen in co-owned U.S. Pat. No. 3,681,808 and reference may be made to that patent for additional details of construction, operation and environment not set forth here.

The socket 21 as can be most readily appreciated from FIG. 8 is a relatively elongated member having a passage or bore 24 extending there through from the smaller end 25 to the larger end 26. A variety of socket constructions can be employed in the practice of the invention and the socket illustrated is but one advantageous form—having a shackle connection at the rear end.

The wedge 23 can be seen in exploded form in FIG. 7 and is seen to include a pair of longitudinally extending wedge forming means 27 and 28.

The identical wedge forming means, i.e., the members 27 and 28 are pinned together by means of a pin 29—still referring to FIG. 7. At the larger wedge end, the members 27, 28 are separated by the insert means generally designated 30.

OPERATION GENERALLY

After the wedge 23 is assembled in the configuration illustrated in FIG. 8, the wire rope 22 is looped about the larger end of the wedge 23 as illustrated in dotted line to provide two lengths 31 and 32 for mounting in the socket 21. As tension T is exerted on the rope 22 as illustrated in FIG. 1, the looped rope and wedge are cinched into place within the socket 21 as illustrated in FIGS. 1 and 2.

When it is necessary to disassemble the wedge and socket, the rope loop is cut—as by burning—in the area of the notch or recess 33 provided adjacent the larger end of the upper member 27. It will be noted that a similar recess is provided in the member 28 so that it makes no difference which of the identical members is positioned upwardly. Upon severance of the rope 22, the larger end of the insert means 30 is exposed.

In the illustration given, this exposes the larger end of the housing 34—see FIG. 7. The housing 34 is constructed of zinc and hence is easily meltable by means of a torch. When the rear end wall 34a (still referring to FIG. 7) is melted, the element stack 35 collapses. This in turn eliminates pressure on the members 27, 28 and thus on the rope lengths 31, 32. There upon, the wedge 23 can be readily removed.

STACKED ELEMENT

The element 35 includes three friction blocks 36, 37 and 38. These blocks are machined at an angle roughly 12° which corresponds to the coefficient of friction of polished steel on polished steel, and therefore these three blocks stacked on top of one another would not stand up but instead slide apart. The advantageous feature of this construction is that with a very small amount of force on both sides of these three pieces, one can maintain their stability from sliding apart and therefore increase their load carrying capability substantially. However, once the restraining force on the back of these three blocks is removed, i.e., the rear wall 34a of the zinc housing 34, then these blocks collapse readily and allow the wedge forming halves to collapse, thus facilitating removal of the entire wedge 23 from the socket.

More particularly, in the illustration given, the angle at which the blocks is machined is that angle whose tangent is slightly greater than the coefficient to friction between the adjoining blocks.

It will also be appreciated that in certain instances the zinc housing 34 may be eliminated inasmuch as the uncut rope 22 itself provides the above described restraining force.

Figure 10:
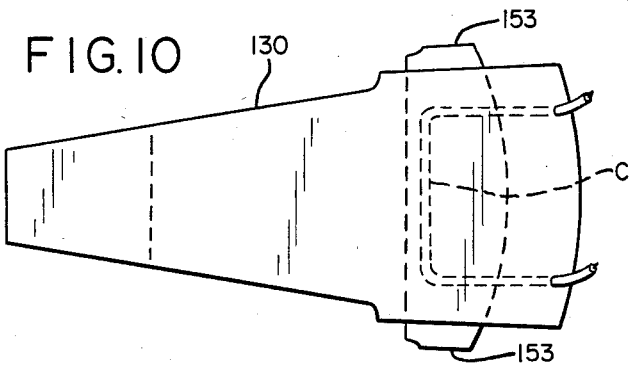
FIG. 10 is a side elevational view of a modified form of wedge insert.

By the same token, it is possible to utilize only a collapsible element such as the block of zinc illustrated in FIG. 10. Zinc is chosen because of its relatively low melting point—of the order of less than 800° F. Collapse via melting of the insert means 130 of FIG. 10 is provided by means of a heating coil C embedded therein and equipped with suitable leads for connection to a source of DC current—virtually always available on the site of dragline bucket operations.

Wedge Forming Means

The details of the wedge forming means 27, 28 can be best appreciated from a consideration of FIG. 7 along with the sectional views of FIGS. 3-6 which are indicated on FIG. 2.

Referring first to FIG. 7, the numeral 39 designates the front bearing area of the wedge which comes into contact with its symmetrical partner when the wedge is assembled.

Just rearward of the front bearing area is the pin boss 40 which is equipped with a hole 42 for the receipt of the pin 29. The pin 29 is employed to pin the wedge halves 27, 28 together to hold them together prior to installation of the composite wedge 23. The pin 29—see FIG. 7—is equipped with an annular, centrally-longitudinally located recess 41 to accommodate a split locking ring 43—see the left hand portion of FIG. 2.

Rearward of the boss 40—referring again to FIG. 7—each wedge forming means 27, 28 is equipped with a recess 44 on one longitudinally extending side and an ear 45 on the other longitudinally extending side. These mate together in the fashion illustrated in FIG. 4.

Also to be noted is that each wedge forming means or half 27, 28 is equipped with a longitudinally extending groove as at 46—best seen in the upper portion of FIG. 7 relative to the wedge forming half 27. This groove or recess continues from the front all the way around the rear or larger end to provide a trough for the seating of the wire rope loop.

The corresponding ears and recesses 45, 44 provide for lateral stability of the wedge 23 in the front to back direction so that the wedge does not slip sideways and put torsional loading on the pin 29.

The recesses and ears 44, 45 are similar to recesses and ears 47, 48 provided just rearwardly of the recesses and ears 44, 45. The interrelationship of the recesses and ears 47, 48 can be appreciated from a consideration of FIG. 5.

The recesses and ears 44, 45 and 47, 48, together with the pin bosses 40 and pin receiving openings 42 provide three pairs of corresponding surfaces along the wedge 23—which make the wedge very stable longitudinally.

As can be seen, upon installation, the ears 45 fit into the recesses 44 when the wedge is both collapsed and in the full open position. The same applies to the ears 48 and recesses 47.

More particularly, each ear 48 is equipped with a tab 49 (compare FIGS. 5 and 7). Each recess 47 is equipped with an intermediate shoulder 50 for bearing cooperation with the tab 49. In operation, the tab 49 comes into contact with the projection or shoulder 50 and allows the wedge halves to open only to a maximum of about 5¼" at the back—the amount of opening, of course, depending upon the size of the wedge and socket—which in turn are governed by the capacity of the dragline bucket. In any event, this limited movement eliminates the load being taken on the pin 29 and the mating surfaces 39—but instead has a contact when the wedge is in the full open position between tab 49 and shoulder 50 and on surface 39 which is the bearing surface. This takes all the load, shear load and torsional load, off the pin and allows for a more durable and tighter fit.

Area 51 is the back surface area and the area along which the removable insert 30 slides along to effect engagement of the wedge 23 with the rope 22 and hence the socket 21. Each surface 51 is arranged at a slight angle with respect to the longitudinal midplane of the wedge 23, i.e., diverging rearwardly of the order of about 3° to allow easy installation of the insert 30 but yet virtually a parallel plane for frictional requirements.

In the illustration given, the rear bearing surfaces 51 each have a ½" deep groove as at 52 for the support of the insert 30 so that the insert does not slide sideways or become dislodged after engagement into the wedge. For this purpose we provide stabilizers in the nature of fins 53 and which are also designated in FIG. 10 by the numeral 153.

As indicated, the inventive wedge has a collapsible insert which allows the wedge to collapse at the back and eliminates pressure on the rope to the side of the socket. After relieving this pressure, the wedge can be removed much more easily than when the frictional force normally present would have to be overcome.

Also, at present, the state of the art wedges because of difficulty of removal, require extensive force for removal which is dangerous whereas the new wedge requires only heat as by a cutting torch. This results in decreasing down time of the machine.

The wedge when assembled is one tight unit and handling is the same as with the present wedge. However, when the unit is removed, the wedge still remains as a unit which can be reused with another insert.

The inventive socket-wedge assembly provides better rope life and in testing, we have found that rope breaking strength was improved as much as 10-15% over previous tests run on the same type of socket.

The invention also decreases rope slippage. Another major complaint about wedge-type sockets is the rope slippage when being used in a cyclical application. With the inventive wedge, which can be easily removed, we can now allow for smaller included angles in the socket and higher wedging action. This higher, tighter wedging action can decrease the possibility of rope slipping before removal is desired.

Still further, the invention reduces damage to sockets. At present, with the cannon or the pendulum ram, there is a certain amount of damage which occurs in the front of the socket due to the high impacts which are required to remove the wedge. With the inventive insert, the wedge is simply and easily removed with very little damage occurring to the socket.

DETAILS OF OPERATION

As a specific example of the wedge 23, the length of each wedge forming means or half 27, 28 is 30", the width about 4½" and the height of each half about 7" at the maximum divergence of the grooved side. The two halves 27, 28 (see particularly FIG. 7) are moved longitudinally relative to each other to have the various recesses and ears 44, 45 and 47, 48 interengaged. At this stage, the snap ring 43 (see FIG. 3) is interfitted between confronting recesses so that when the pin 29 is inserted into the aligned holes 42 in the bosses 40, it can be maintained in place.

Thereupon the insert 30 is assembled utilizing the housing 34 and the three tapered blocks 36-38. These are then inserted into the recess in the housing 34 in the fashion indicated in FIG. 7.

The wire rope 22 is inserted through the opening 24 and folded on itself as indicated in FIG. 8, lying in the grooves 46 of each of the wedge forming halves 27, 28. With the wedge and rope in the position indicated in FIG. 8, the rope is tensioned so as to pull the assembly into the tapered socket opening 24.

Both sets of recesses and ears 44, 45 and 48, 49 assist in maintaining longitudinal alignment and the removal of shear and torsional forces on the pin 29.

The tabs 49 and shoulders 50 limit the spacing apart of the two halves 27, 28 due to the interposition of the wedge means 30.

When wedge removal is indicated, the rope is severed by burning through in the area of the notch 33 to arrive at the FIG. 9 configuration. Thereafter, the torch is applied to the now-exposed rear of the zinc housing 34 to free the stacked elements 35. Because these elements are related by an angle greater than the coefficient of friction, the removal of the longitudinal constraint permits these elements to slide relative to each other and eject the central element 37. This results in a collapse of the wire clamping force so that easy removal of the wedge is facilitated—and without the extraordinary expedients of the prior art.

Figure 12:
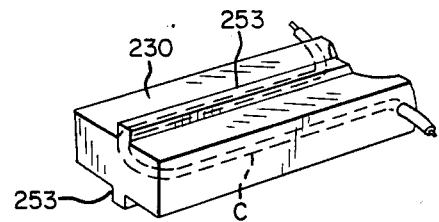
FIG. 12 is a perspective view of the insert employed in FIG. 11.
Figure 11:
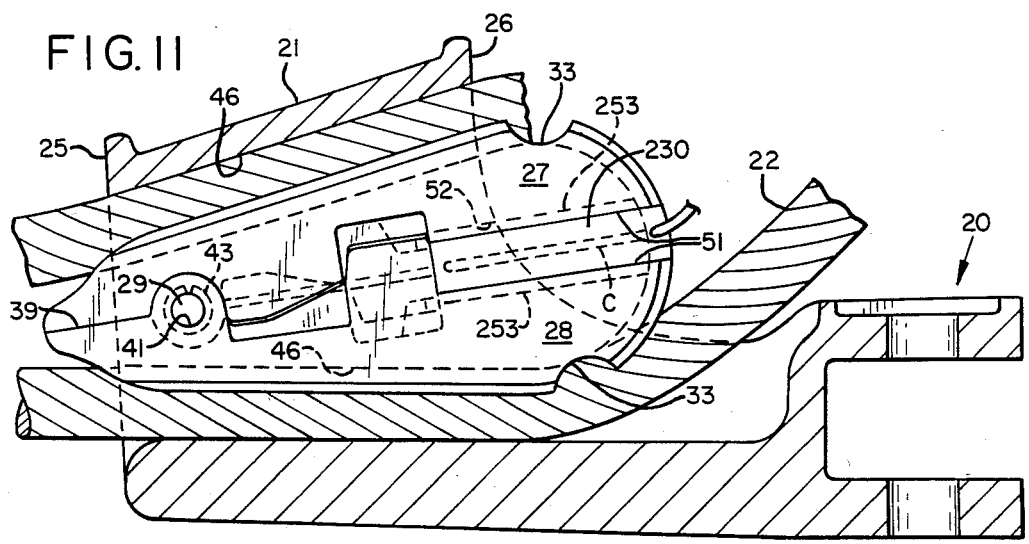
FIG. 11 is a longitudinal sectional view of a modified form of the inention.

The collapsible element may be the central block of a stack as seen in FIG. 10 or may be a unitary element which is substituted for the entire stack as seen in FIGS. 11 and 12 where the element is designated 230, having an integral fin or rib 253 and embedded heating coil C.

While in the foregoing specification, a detailed description of an embodiment of the invention has been set down for the purpose of illustration, many variations in the details hereingiven may be made by those skilled in the art without departing from the spirit and scope of the invention.

We claim;

1. A socket-wedge connection for the wedge-type rope socket for an excavating bucket or the like comprising a relatively elongated socket having a larger end and a smaller end, a tapered passage extending from one end to the other, a rope in said passage looped upon itself to provide two lengths of rope in said passage with a loop adjacent said larger end, and a relatively elongated wedge between said two lengths, said wedge having a pair of longitudinally-extending wedge-forming means with collapsible insert means therebetween for relieving pressure on said two lengths, said insert means including a plurality of longitudinally tapered block means arranged to slide relative to each other unless constrained against relative longitudinal movement.

2. The connection of claim 1 in which the angle of block taper has a tangent greater than the coefficient of friction between adjacent blocks.

3. The connection of claim 1 in which said insert means includes a heat destructible housing means for said block means to provide longitudinal constraint.

4. Socket-wedge for a wedge-type rope socket connection of an excavating bucket comprising two wedge-forming halves pivotally interconnected adjacent the small wedge end and equipped with confronting surfaces adjacent the larger wedge end, and a collapsible insert between said surfaces, said insert including a plurality of stacked tapered blocks adapted to slide relative to each other in the absence of longitudinal constraint.

5. The wedge of claim 4 in which said blocks are constructed of polished steel and the angle of taper is at least about 12°.

6. A method of manipulating a wedge-type rope socket connection for an excavating bucket or the like comprising providing a relatively elongated socket having a tapered passage extending from one end to the other, installing a multiple-part wedge and rope in said passage wherein said wedge includes outer tapered members and a collapsible insert and, when disassembly of said connection is required, collapsing said element, said insert including a plurality of stacked tapered blocks slidable with respect to each other upon removal of a block sustaining force, and said collapsing step includes removal of said sustaining force.

* * * * *